(12) United States Patent
Palermo (10) Patent No.: US 8,157,229 B2
(45) Date of Patent: Apr. 17, 2012

(54) VEHICLE BED RAINGUTTER BRACKET FOR RACK SYSTEM

(76) Inventor: Brian Palermo, Dryden, NY (US)

( * ) Notice: Subject to any disclaimer, the term of this patent is extended or adjusted under 35 U.S.C. 154(b) by 1238 days.

(21) Appl. No.: 11/861,502

(22) Filed: Sep. 26, 2007

(65) Prior Publication Data

US 2008/0230665 A1    Sep. 25, 2008

Related U.S. Application Data

(60) Provisional application No. 60/896,012, filed on Mar. 21, 2007.

(51) Int. Cl.
*A47B 96/06* (2006.01)

(52) U.S. Cl. ........... 248/231.71; 248/316.6; 296/100.02; 410/106; 224/403

(58) Field of Classification Search .................. 224/403, 224/405; 248/231.7, 316.6, 48.1, 48.2; 410/106, 410/110
See application file for complete search history.

(56) References Cited

U.S. PATENT DOCUMENTS

| | | | | |
|---|---|---|---|---|
| 2,398,306 A * | 4/1946 | Hermanson | ............ | 403/385 |
| 4,209,897 A * | 7/1980 | Davies | ............ | 29/768 |
| 4,721,239 A * | 1/1988 | Gibbs et al. | ............ | 224/322 |
| 4,901,963 A | 2/1990 | Yoder | ............ | 24/489 |
| 5,052,737 A * | 10/1991 | Farmer, Jr. | ............ | 296/39.2 |
| 5,228,739 A * | 7/1993 | Love | ............ | 296/100.02 |
| 5,261,719 A | 11/1993 | Tucker | | |
| 5,310,238 A * | 5/1994 | Wheatley | ............ | 296/100.18 |
| 5,494,327 A * | 2/1996 | Derecktor | ............ | 296/3 |
| 5,584,521 A | 12/1996 | Hathaway | | |
| 5,655,808 A * | 8/1997 | Wheatley | ............ | 296/100.17 |
| 5,975,618 A * | 11/1999 | Rippberger | ............ | 296/100.18 |
| 6,024,402 A * | 2/2000 | Wheatley | ............ | 296/100.18 |
| 6,059,159 A | 5/2000 | Fisher | | |
| 6,196,777 B1 * | 3/2001 | Price | ............ | 410/102 |
| 6,256,844 B1 * | 7/2001 | Wheatley | ............ | 24/265 CD |
| 6,338,520 B2 * | 1/2002 | Rusu et al. | ............ | 296/100.07 |
| 6,349,910 B1 * | 2/2002 | White | ............ | 248/231.61 |
| 6,604,898 B2 * | 8/2003 | Price | ............ | 410/102 |
| 6,742,973 B1 * | 6/2004 | Hendrix et al. | ............ | 410/106 |
| 6,913,175 B2 | 7/2005 | Martin | | |
| 7,296,837 B2 * | 11/2007 | Niedziela et al. | ............ | 296/3 |
| 7,549,828 B2 * | 6/2009 | Smith | ............ | 410/106 |
| 7,753,425 B2 * | 7/2010 | Niedziela et al. | ............ | 296/3 |
| 2009/0026784 A1 * | 1/2009 | Green | ............ | 296/3 |

* cited by examiner

*Primary Examiner* — Terrell McKinnon
*Assistant Examiner* — Daniel J Breslin
(74) *Attorney, Agent, or Firm* — Brown & Michaels, PC (57) ABSTRACT

A mounting bracket for securing a raingutter-mountable roof rack system to the bed or cargo management rail of a pickup truck or SUV. The bracket comprises a simple device with a minimal number of parts required for removably clamping the bracket to the side member of a vehicle bed. The bracket is simple to install, may be located anywhere along the side of the vehicle bed, and does not require the presence of a bed cover system for attachment to the vehicle. The bracket attaches to the side of the vehicle's bed in a manner that does not consume a substantial amount of space within the bed of the vehicle, and it may be used in conjunction with a tonneau cover without interfering with the operation of the cover.

18 Claims, 8 Drawing Sheets

VEHICLE BED RAINGUTTER BRACKET FOR RACK SYSTEM

REFERENCE TO RELATED APPLICATIONS

This application claims one or more inventions which were disclosed in Provisional Application No. 60/896,012, filed Mar. 21, 2007, entitled "VEHICLE BED RAINGUTTER BRACKET FOR RACK SYSTEM". The benefit under 35 USC §119(e) of the United States provisional application is hereby claimed, and the aforementioned application is hereby incorporated herein by reference.

BACKGROUND OF THE INVENTION

1. Field of the Invention

The present invention relates to a utility rack adapter bracket. More particularly, the present invention relates to a bracket for use with a gutter-mountable utility rack allowing such a rack to be mounted on the side members of the bed of an open bed vehicle such as a pickup truck.

2. Description of Related Art

The major manufacturers of carrying rack systems for vehicles (e.g. Thule™ and Yakima™) offer devices known as raingutter towers. Raingutter towers are designed to mount to a vehicle's raingutters (located above the doors where the roof meets the vehicle's sides) to provide support for crossbar members. The raingutter towers and crossbar members act together to securely support loads above the top of the vehicle. The crossbars further act as a point of attachment for various accessories. Crossbar accessories are available to carry specific items such as bicycles, kayaks, skis, and cargo boxes.

Several vehicle manufactures have begun including cargo management systems in the bed of their pickup trucks. Cargo management systems consist of rails along the inner edge of the bed rail or just under the bed rail. The cargo management rail geometry varies by manufacturer but all are designed for the same purpose: to support various accessories such as ladder racks, toolboxes, tie down cleats, and bed dividers.

The utilization of gutter-mountable racks above the cargo areas of pickup trucks or other open bed vehicles is attractive since mounting such racks above the passenger area of such a vehicle results in the cargo being at an inconvenient height making it difficult to place and remove items, thereby creating potential hazards due to the high center of gravity of a load thus carried. Also, there is an increased risk that the heightened load might strike low bridges or trees while the vehicle is in motion.

The manufacturers of raingutter towers offer bolt-on rain gutter brackets. These are metal brackets which have geometries similar to a vehicle's rain gutter and which are designed to be bolted onto a surface to provide an alternative means of support for rain gutter towers. These brackets are used primarily on pickup truck caps and their use requires that holes be drilled in the caps so that the attachment bolts may be secured.

Carrying rack systems specifically designed for use on or in the bed of an open bed vehicle are also known in the art. All of the rack systems specifically designed for open bed vehicles—e.g. pickup trucks and sport utility vehicles (SUVs)—have some undesirable features and limitations. These limitations include: the requirement that holes be drilled in the vehicle for attachment; mounting inside the bed area thereby consuming valuable space within the bed; mounting on the bed rail in such a way that a bed covering system (e.g. a tonneau cover) either cannot be used or requires apertures be provided in the cover; or requiring the presence of a bed covering system to secure the rack system to the bed rails.

One class of cargo rack systems for use in open bed vehicles utilizes components that are add-ons or accessories for bed covering systems. Such covering systems typically feature rails which are mounted to the top surfaces of the side members of an open truck bed. Normally, this is done by removably clamping the rails to an inner surface or underside on the edges of the truck bed sides. Alternatively the rails of systems are affixed to the bed sides by drilling holes in the top surfaces of the sides and inserting fasteners. There exist accessories that allow the addition of load carrying racks to the rails of bed covering systems. Such a bed covering system with accessory load carrying components is described in U.S. Pat. No. 5,261,719, to Tucker. Among the disadvantages of these systems are that they are not compatible with common commercially available gutter mount rack systems, and that they require the presence of bed cover mounting rails for attachment, and cannot therefore be used unless such a covering system is installed on the vehicle.

U.S. Pat. No. 6,059,159 to Fisher discloses a bracket for securing a commercially available gutter-mountable rack system to the bed of a pickup truck. The Fisher device consists of a bracket which allows attachment of a rain gutter tower. The device relies on a bed cover system as described above to secure it to the rails of the truck bed. No provision is provided for attachment of Fisher's bracket in the absence of such a bed covering system. FIG. 9 of the '159 patent depicts a cutaway view of the Fisher bracket attached to the side member of a truck bed. The bracket is situated between the truck body members and a rail which is a component of a truck bed cover system. The bracket is secured to the truck by tightening a bolt such that a lower clamp member is pressed against the lower surface of the pickup truck side wall, and an upper clamp member bears against an upper surface of a rail component which in turn bears on the upper surface of the clamp. Thus, attachment of the bracket to the truck body requires three clamping components. It is taught that the clamps may be those provided with a bed cover system. In that case, the bracket's location on the truck bed will be limited to the clamping locations designated by the bed cover manufacturer. Installation of the bracket must be performed at the same time as installation of the bed cover system, and installation is complicated by the fact that bed cover components must be removed and reinstalled to affect attachment of the bracket. Fisher also discloses that the bracket may be attached with a two part clamp which is not a part of the bed covering system. This would allow alternate positioning of the bracket, and could enable the bracket to be attached to a truck which does not have a bed cover, but attachment of the bracket would still require that additional components be provided. This complicates assembly of the bracket to the truck, and the presence of three components increases the likelihood that the bracket will loosen with use, since the components may shift relative to one another or deform with use.

U.S. Pat. No. 6,913,175 to Martin discloses a carrying rack mountable to the bed of a truck. In a first embodiment illustrated in FIG. 5 of the '175 patent, the bracket mounts to a cover mounting rail. The bracket is mounted by means of screws which engage a slider. Tightening the screws draws the bottom surface of the bracket against the top of the rail. The bracket is thus attached to the rail and not directly to the truck bed. A second embodiment is illustrated in FIG. 7 of the '175 patent. Here, the bracket has a profile designed to pass over the cover mounting rails and mount to the side of the truck bed by means of a multipart clamp consisting of an upper member, a lower member and a bolt. The bracket, by virtue of its passing over the bed cover rails, is likely to interfere with the installation and removal of the bed cover since it obstructs a portion of the mounting rail. The profile of the bracket, being designed to pass over and contact the cover mounting rail, means that the bracket is not usable unless such a rail is present. Furthermore, since the bracket and clamp assembly consists of at least 3 separate parts, installation is likely to be relatively difficult and the likelihood of the bracket working loose is increased by the plurality of components used. Finally, in either embodiment the geometry of the vertical members, precludes the attachment of a commercially-available gutter-mountable rack system. The brackets must be used with the specially designed load bars. Martin '175 has no provision for employing existing racks, such as ones manufactured by Yakima™ or Thule™.

U.S. Pat. No. 6,604,898 to Price discloses a clamp for attachment to a truck bed. The clamp is designed to support a rod which spans the width of the truck bed, or a D-ring or similar tie-down attachment point. The clamp does not allow attachment of a commercial rain-gutter mounted rack to the bed of the truck.

U.S. Pat. No. 5,261,719, to Tucker is directed to an apparatus for attaching a cover for an open-topped vehicle enclosure and includes an optional cargo carrier. Cargo support members are attachable between opposing rail members to carry items, such as skis, bicycles, and the like. The cargo support members include accessory bars that span the opposing rail members and attach to the rails. The accessory bar bolts through an accessory adapter insert and to an accessory clamp member. Tucker '719 has no provision for employing existing racks, such as ones manufactured by Yakima™ or Thule™.

U.S. Pat. No. 5,584,521, to Hathaway et al., discloses a utility rack similar to Tucker '719. The device of Hathaway et al. allows a bicycle rack to be attached to a bed cover assembly. In order to accommodate the bicycle rack with the modular rail system, dovetailed projections are provided on the bottom of the bicycle rack. The dovetailed projections fit into corresponding dovetailed recesses in the modular rail system. As with Tucker '719, Hathaway et al. does not permit the use of existing bicycle racks, such as ones manufactured by Yakima™ or Thule™ to be employed with the modular rail system, without necessitating major reconstruction to clamp the bicycle rack to the modular rail system.

Both Tucker '719 and Hathaway et al. require racks specifically designed for use with their own specific bed covering systems, and do not contemplate the use of conventional racks with their systems. Any attempt to utilize an existing bicycle rack with either the Tucker '719 or Hathaway et al. assembly would require complicated reconstruction.

SUMMARY OF THE INVENTION

The present invention addresses the undesirable features of these prior art devices by providing a bracket that enables one to install a commercial raingutter tower rack system on either the bed rails or cargo management rail system of a pickup truck or other open-bed vehicle such that the rack is elevated above the top of the bed. In one embodiment, the bracket is designed as an integrated device to be attachable without drilling holes in the vehicle and without the need for additional clamps or hardware. The bracket operates without the substantial consumption of space within the bed of the vehicle, and without requiring the presence of a bed cover system for attachment of the bracket to the vehicle. Furthermore, though a bed covering system is not required to use the bracket of the invention, the bracket does not interfere with the installation or use of such a bed cover and such a cover may be placed and removed while the brackets are installed.

The present invention provides a mounting bracket for securing a raingutter-mountable roof rack system to the bed of a pickup truck or SUV. The bracket comprises a simple device with a minimal number of parts required for clamping the bracket to the side member of a vehicle bed or cargo management rail. The bracket is simple to install, may be located anywhere along the side of the vehicle bed, and does not require the presence of a bed cover system for attachment to the vehicle. The clamping mechanism clamps to the side of a vehicle's bed in a manner that does not consume a substantial amount of space within the bed of the vehicle, and it may be used in conjunction with a tonneau cover without interfering with the operation of the cover.

DETAILED DESCRIPTION OF THE INVENTION

In a first embodiment of the invention, the bracket is formed from sheet metal or metal plate by conventional means such as bending. The metal can be any having reasonable strength for the application and formability characteristics consistent with the final shapes described herein. Suitable metals include cold-rolled steel, hot rolled steel, galvanized steel, stainless steel, aluminum, brass etc. Alternatively, the bracket could be made from a high strength plastic or composite material, or it could be made from any combination of the aforementioned materials. The surface finish of the bracket is not critical to the invention, but resistance to corrosion is a desirable quality for the application, thus if a metal employed is not naturally resistant to corrosion, it should preferably be treated by painting, powder-coating, plating, galvanizing, anodizing or the like. Other means of manufacturing the bracket are also possible including welding, brazing, molding, stamping, forging etc. and the references herein to bending or forming do not exclude such alternatives.

Figure 1:
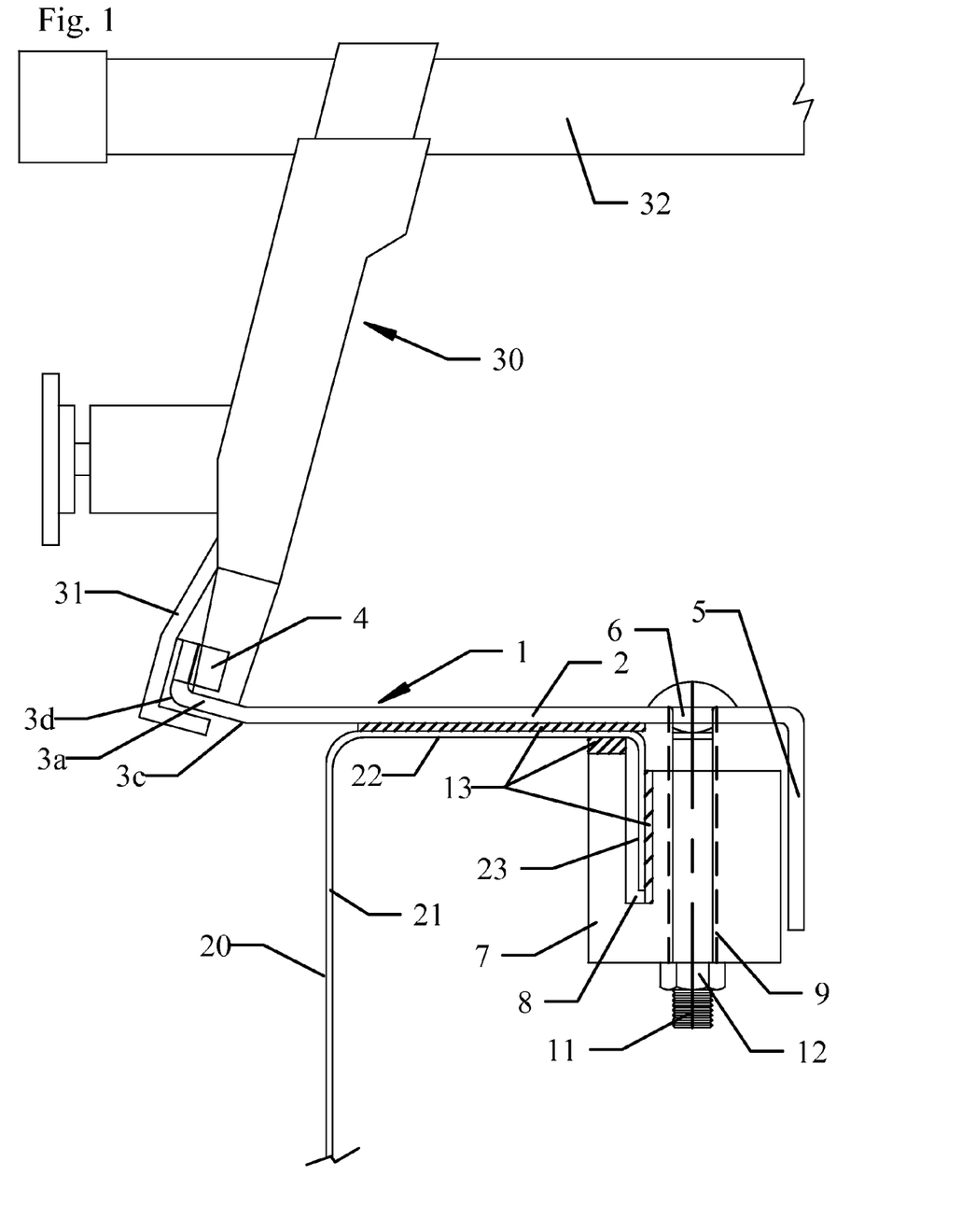
FIG. 1 shows a cutaway side view of a first embodiment of the bracket of the invention attached to a vehicle bed and supporting a raingutter-mountable rack system.
Figure 2A:
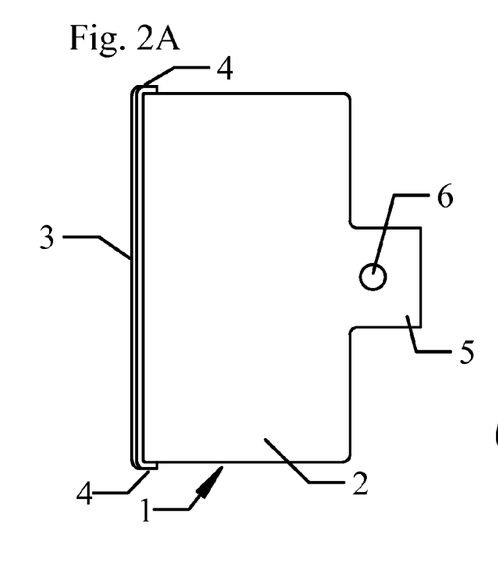
FIG. 2A shows a top plan view of a bracket of the invention.
Figure 2B:
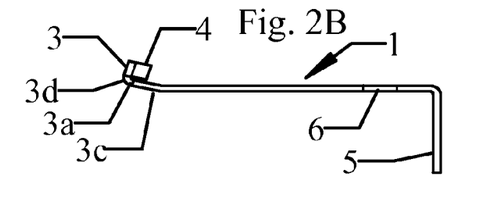
FIG. 2B shows a side-view of a bracket of the invention.

A first embodiment of the present invention is presented in FIGS. 1, 2A, and 2B. In FIG. 1 bracket 1 is depicted in a cutaway view attached to the sidewall 20 of a vehicle bed. The sidewall 20 has an outer panel 21, a top rail 22, and an inner rail 23. Bracket 1 includes a horizontal member 2, a vertical member 5, and an upright member 3 on which optional tabs 4 may be formed. Horizontal member 2 is designed to rest upon the upper surface of top rail 22 of the vehicle bed sidewall 20. The outer edge of member 2 is bent upward to create upright member 3 for attachment of a commercial rain gutter tower. Upright member 3 is created by a compound bend in horizontal member 2. The compound bend comprises obtuse bend 3c and substantially right angle bend 3d. Thus, an obtuse angle exists at 3c where the plane of horizontal member 2 meets the plane intermediate member 3a. A substantially right angle is formed at bend 3d where the planes formed by intermediate member 3a and upright member 3 intersect. The combination of obtuse bend 3c and substantially right angle bend 3d cause the plane of upright member 3 to lie at a slightly acute inward-facing angle relative to the plane of horizontal member 2. Tabs 4 are formed on upright member 3 and are most clearly seen in the plan view of FIG. 2A. The tabs 4 may be formed by bending the edges of upright member 3 inward at a substantially right angle relative to the length of member 3. A vertical member 5 extends downward from horizontal member 2 at the edge opposite the edge bearing upright member 3. A hole 6 is provided through horizontal member 2 to accommodate a clamping component.

In use, bracket 1 is attached to the vehicle bed side member 20, such that the lower surface of horizontal member 2 lies against the upper surface 22 of the bed side member. Vertical member 5 extends downward inside the vehicle bed substantially parallel to vehicle side bed rail 23. In the embodiment shown in FIG. 1, bracket 1 is removably attached to the vehicle bed by a clamping member 7. There may be one or more clamping members per bracket. Clamping member 7 has an upper surface which contacts the underside of vehicle bed side member 22. A slot 8 in clamping member 7 accommodates vehicle bed rail 23—preferably such that at least one inner surface of slot 8 contacts the vehicle bed rail 23. Parallel to slot 8, clamping member 7 contains a through bore 9 to accommodate a fastener. In the embodiment illustrated in FIG. 1, the fastener comprises bolt 11 and threaded nut 12 which may include optional washers (not shown). Bolt 11 passes through hole 6 in bracket 1 and through bore 9 in clamping member 7. As nut 12 is tightened, the upper surface of the clamping member bears on the underside of vehicle bed top rail 22. Additionally, as the nut is tightened, the head of bolt 11 bears on the top of horizontal member 2 pressing the lower surface of 2 onto the upper surface of vehicle bed top rail 22. Additionally, at least one surface of slot 8 may provide further clamping contact between clamping member 7 and the inner rail 23. Together these contact points securely hold the bracket 1 onto the vehicle bed side 20. Clamping member 7 may be made of any suitably rigid material, such materials include: metal, plastic, rubber, wood, composites, or combinations of such materials.

A protective material 13 may optionally be provided between the contacting surfaces of bracket 1, clamping member 7, and vehicle bed member 20. Protective material 13 is preferably a resilient compound such as a polymer or elastomer. Examples of suitable materials include, rubber, latex, butyl rubber, Buna-N rubber, foam rubber, EPDM rubber, neoprene rubber, silicone rubber, viton rubber, urethane, plastic, polyethylene (PE), high density polyethylene (HDPE), ultra high molecular weight polyethylene (UHMW), Nylon, fluoropolymers, Teflon®, Kynar, etc as well as natural materials such as cork, or composites or combinations of any such materials. The presence of protective material 13 protects the vehicle's finish and may optionally also act to increase the friction between the surfaces thereby affording a more secure attachment of bracket 1 to the vehicle. In addition, bracket 1 may be dip-coated with a protective material.

Numerous variations of the fastener illustrated in FIG. 1 may be employed to provide the clamping force necessary to hold the bracket to the vehicle. For example: the bore 9 could be wholly or partially threaded for direct engagement with a threaded fastener (in which case bore 9 could be either a through bore or a blind bore); the bore 9 could be provided with a larger diameter portion at the bottom to contain threaded nut 12 and avoid protuberances at the bottom of clamping member; the threaded fastener could be inverted to place the nut on top of horizontal member 2, a thread could be provided in 2 to receive a threaded fastener from below; bolt 11 could be replaced with a cam-operated mechanism; and, in general, any other such clamping mechanisms as are well known to the art could be employed.

When bracket 1 is in place on the vehicle bed member 20 as described above, upright member 3 acts as a simulated rain gutter and provides a clamping surface for a clamping mechanism 31 of a rain gutter tower 30. Rain gutter tower 30 supports one end of a load bar 32 above the vehicle's bed. A second, substantially identical, bracket and raingutter tower assembly (not shown) is attached in like fashion to the opposite side member of the vehicle bed to support the other end of load bar 32. Preferably, the two bracket and raingutter tower assemblies are placed at substantially equal distances forward from the rear of the vehicle such that the load bar 32 supported by them is substantially perpendicular to length of the vehicle.

Figure 2C:
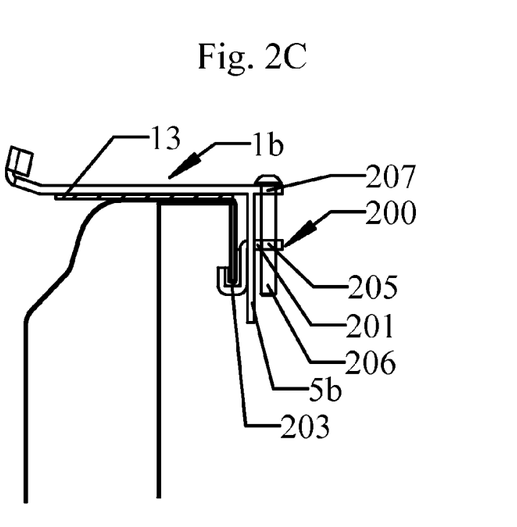
FIG. 2C shows a cutaway side view of a third embodiment of the invention mounted to a vehicle bed.
Figure 2D:
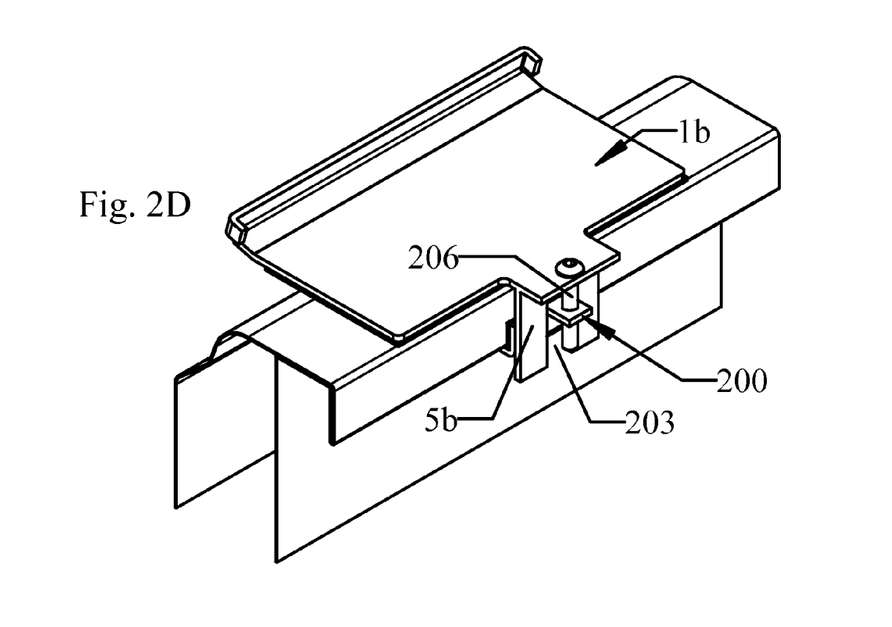
FIG. 2D shows a perspective view of a third embodiment of the invention mounted to a vehicle bed.

A second embodiment of the invention is illustrated in FIGS. 2C and 2D. In this embodiment, the bracket 1b includes a vertical member 5b that is slotted to accommodate a horizontal tab 201 of clamping member 200. Clamping member 200 has a horizontal tab 201 and a vertical portion bearing a slot 203. As best shown in FIG. 2C, slot 203 is designed to engage a lip on a vehicle bed rail. The horizontal tab 201 of clamping member 200 is accommodated by the slot in vertical member 5b and includes a threaded through hole 205 that engages a threaded fastener 206. Threaded fastener 206 passes through a bore 207 in bracket 1b. Turning threaded fastener 206 biases the clamping member 200 and can bring slot 203 into engagement with a lip of the vehicle bed rail as shown in FIG. 2C. Further tightening of fastener 206 provides a clamping action similar to that described for the first embodiment above. A protective material 13 may optionally be provided between the bracket 1b and the top of vehicle bed rail as well as on the inner surfaces of slot 203 where the slot contacts the lip of the vehicle bed rail.

Figure 3:
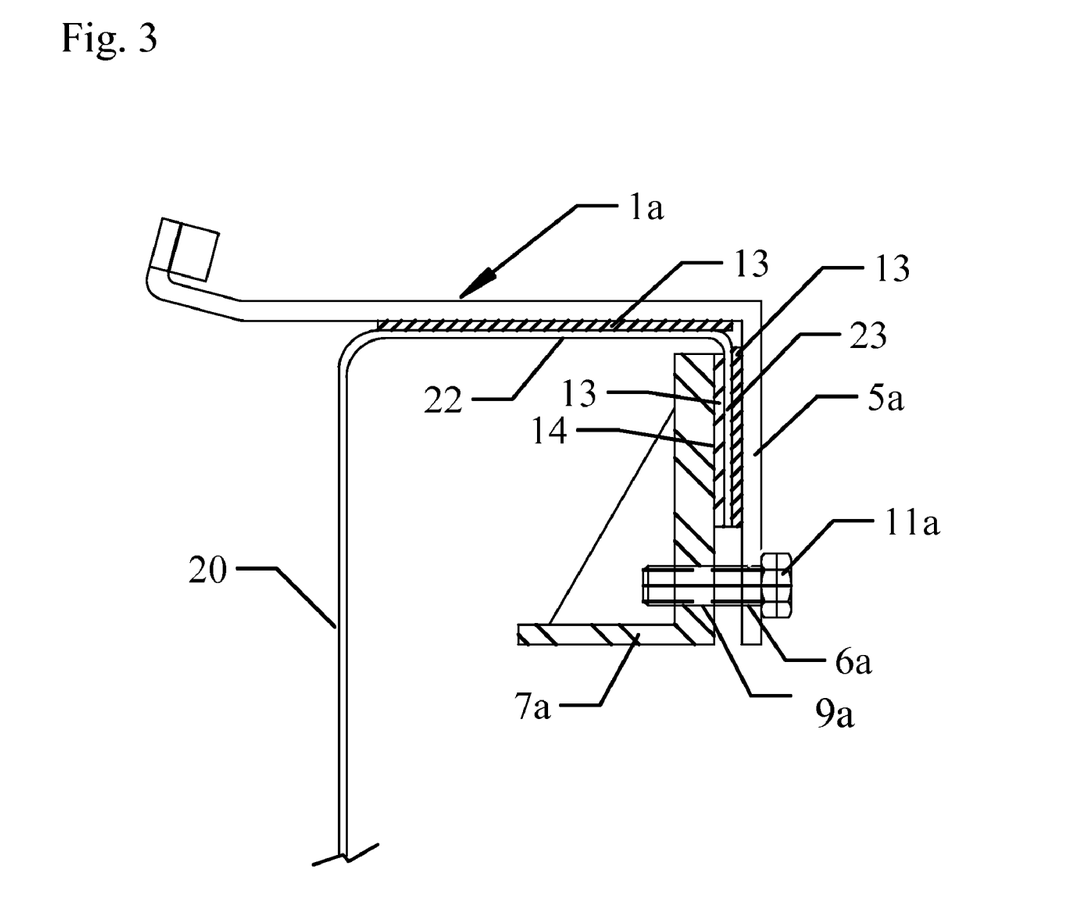
FIG. 3 shows a cutaway side view of a third embodiment of the bracket of the invention mounted to a vehicle bed with an alternative clamping mechanism.

A third embodiment of the invention is illustrated in FIG. 3. In this embodiment, a hole 6a is provided in vertical member 5a of a bracket 1a. A clamping member 7a has a bore 9a to receive a fastener 11a which passes through hole 6a. When fastener 11a is tightened, vertical surface 14 of clamping member 7a is drawn against the inside surface of vehicle bed rail element 23 and the inner surface of vertical member 5a is drawn against the outer surface of rail 23. As described above, a protective material 13 may be provided between the contacting surfaces of the bracket and the vehicle. Furthermore, the system used to attach the bracket and clamping member may be any clamping mechanism as is well known in the art, such as a threaded bolt or a nut and bolt combination.

Figure 4A:
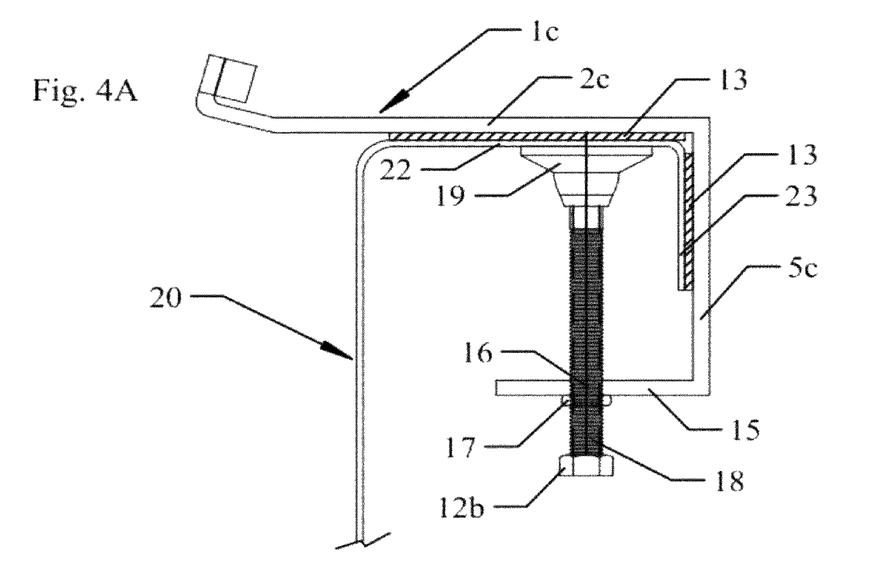
FIG. 4A shows a cutaway side view of a fourth embodiment of the bracket of the invention mounted to a vehicle bed.

FIG. 4A illustrates a fourth embodiment of the present invention in which the bracket and clamping means comprise a single integrated device 1c (e.g. no separate clamping member such as 7 or 7a is required). The bracket 1c of FIG. 4A is similar in design to that described above with reference to FIGS. 1, 2A, 2B and 3, except a second horizontal member 15 is present. The second horizontal member 15 may be formed by bending the lower edge of vertical member 5c inward at a substantially right angle such that the second horizontal member is situated below and parallel to horizontal member 2c. Second horizontal member 15 is provided with vertical bore 16. Bore 16 is threaded, and is optionally strengthened by a thickening flange 17. Fastener 18 may also have a nut located on either the upper or lower surface of horizontal member 15 which prevents fastener 18 from loosening during use. Bore 16 engages a threaded fastener 18. In the embodiment depicted, fastener 18 comprises a shaft at least a portion of which is threaded externally for engagement with threaded bore 16. The shaft 18 has a lower end and an upper end, the upper end being engaged with a clamping pad 19, and the lower end having a means for gripping the shaft for the purpose of rotating it—in the embodiment illustrated this gripping provision consists of a hexagonal head 12b suitable for engagement by a wrench or socket—the provision for gripping the shaft could also be provided by a handle, a thumbscrew, a toggle, a crossbar etc. By virtue of the fact that the diameters of the clamping pad and the gripping portion are larger than the diameter of bore 16, the shaft 18 is non-removably attached to bracket 1c. The clamping pad may also have a square or rectangular shape and be created of a composite, metal plate with rubber pad or coating. By virtue of the threads on shaft 18 engaging the threads in bore 16, shaft 18 is rotatable. Turning the shaft 18 biases pad 19 along an axis substantially perpendicular to horizontal members 2c and 15. To attach the bracket of FIG. 4A to the vehicle bed side member 20, the shaft 18 is rotated in a direction to bias the clamp pad 19 to a location a sufficient distance away from horizontal member 2c to allow the bracket to be placed upon the vehicle bed side member such that the inner surface of vertical member 5c is in contact with the surface of bed rail 23. The threaded shaft is then rotated in the opposite direction to bias the clamp pad upward until it contacts the lower surface of the vehicle bed top rail 22. As the shaft 18 is tightened, the lower surface of horizontal member 2c increasingly forcibly presses onto the upper surface of vehicle bed member 22, thus securing the bracket 1c. As described above, protective material 13 may optionally be provided between the contacting surfaces of bracket and vehicle. A similar material (not shown) may optionally be provided on the surface of pad 19 for the same reasons.

Figure 4B:
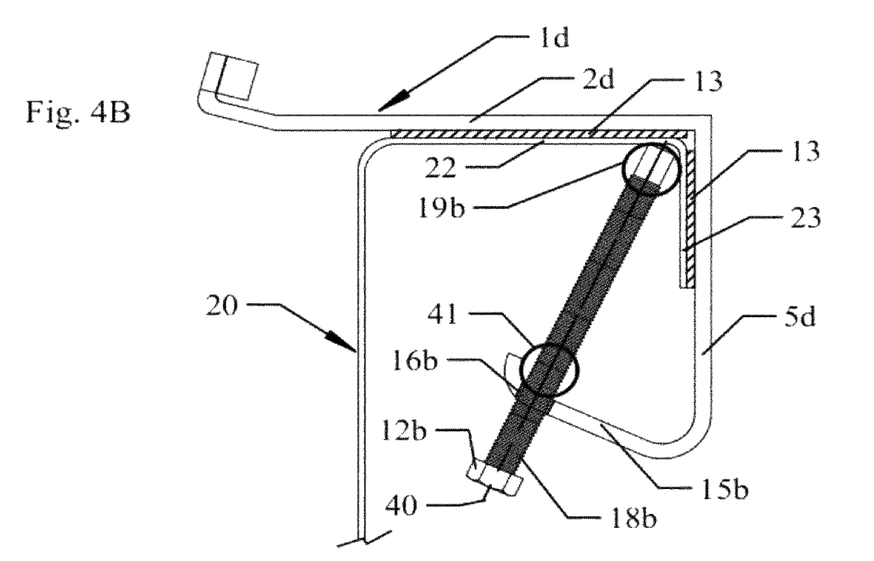
FIG. 4B shows a cutaway view of a fourth embodiment of the bracket of the invention mounted to a vehicle bed with an alternative clamping mechanism.
Figures 5A, 5B:
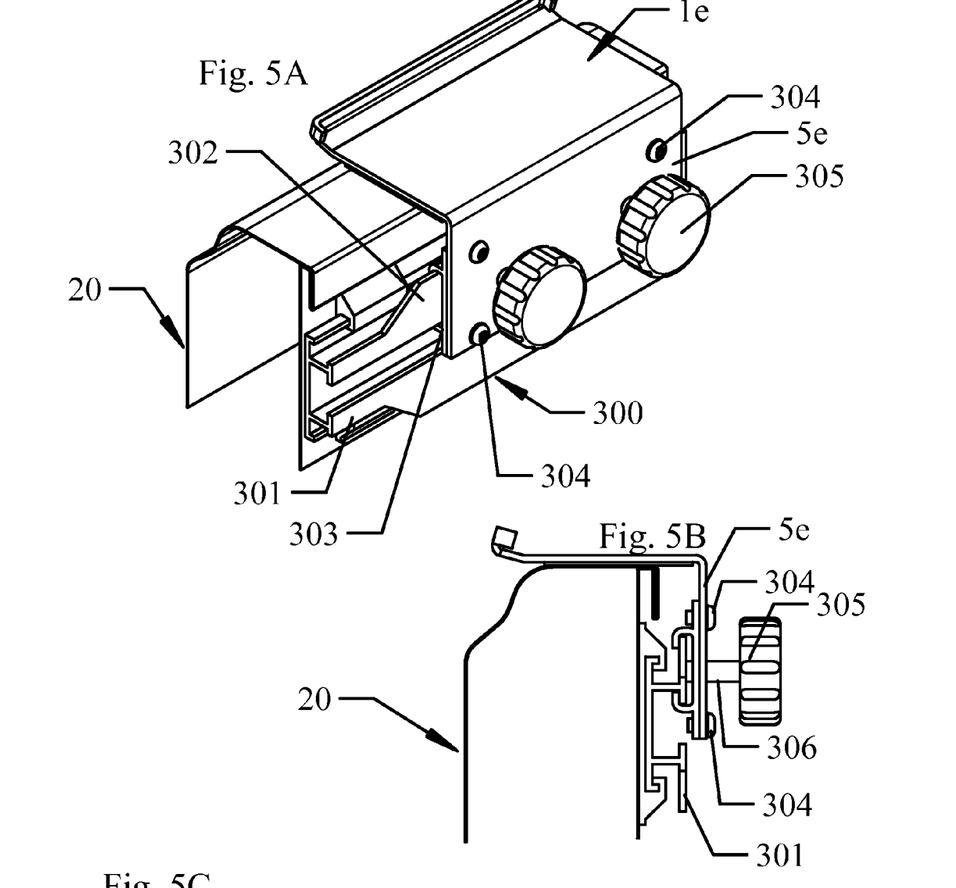
FIG. 5A shows a perspective view of a fifth embodiment of the bracket of the invention designed to mate to a cargo management rail.
FIG. 5B shows a cutaway view of the bracket of FIG. 5A.
Figure 5C:
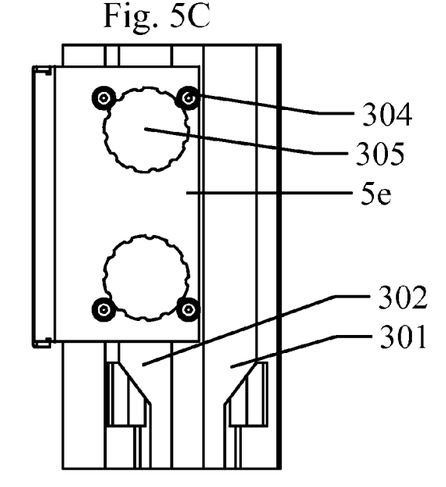
FIG. 5C shows a side view of the bracket of FIG. 5A.
Figure 5D:
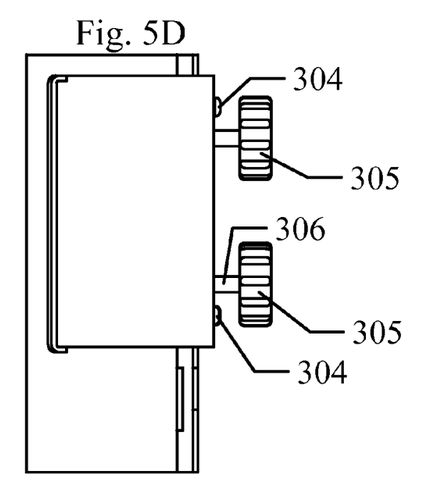
FIG. 5D shows a top plan view of the bracket of FIG. 5A.
Figures 6A, 6B:
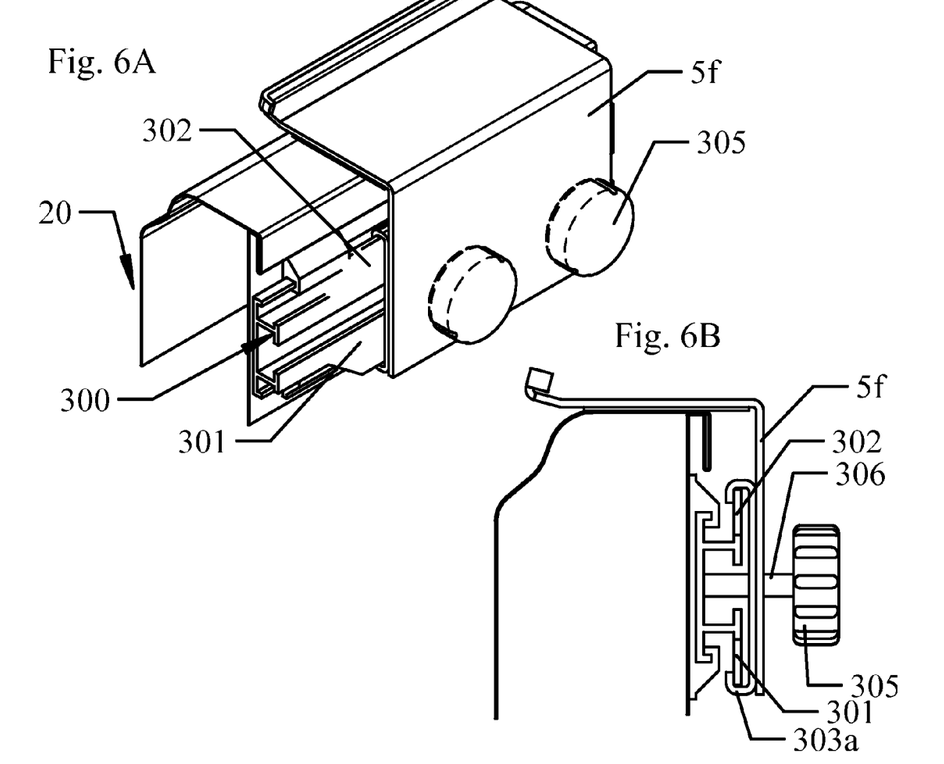
FIG. 6A shows a perspective view of a sixth embodiment of the bracket of the invention designed to mate to a cargo management rail.
FIG. 6B shows a cutaway view of the bracket of FIG. 6A.
Figure 6C:
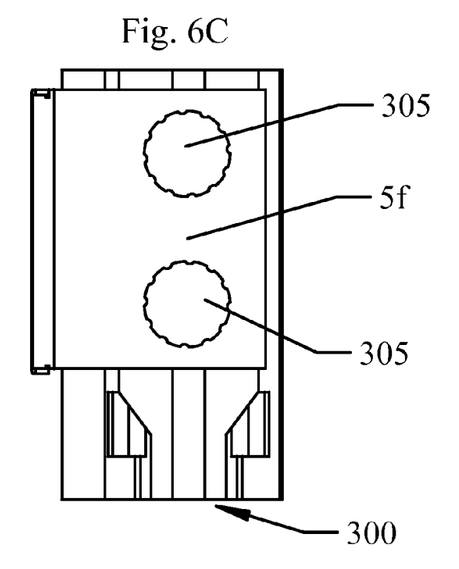
FIG. 6C shows a side view of the bracket of FIG. 6A.
Figure 6D:
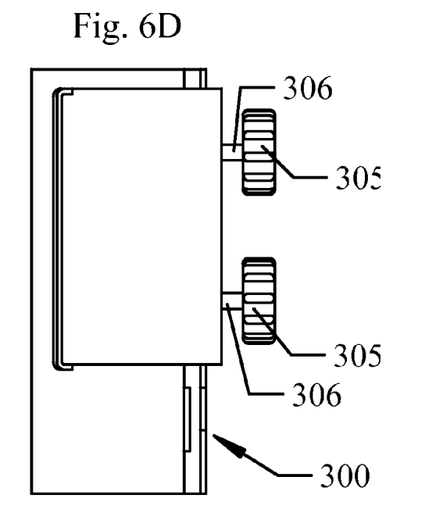
FIG. 6D shows a top plan view of the bracket of FIG. 6A.
Figures 7A, 7B:
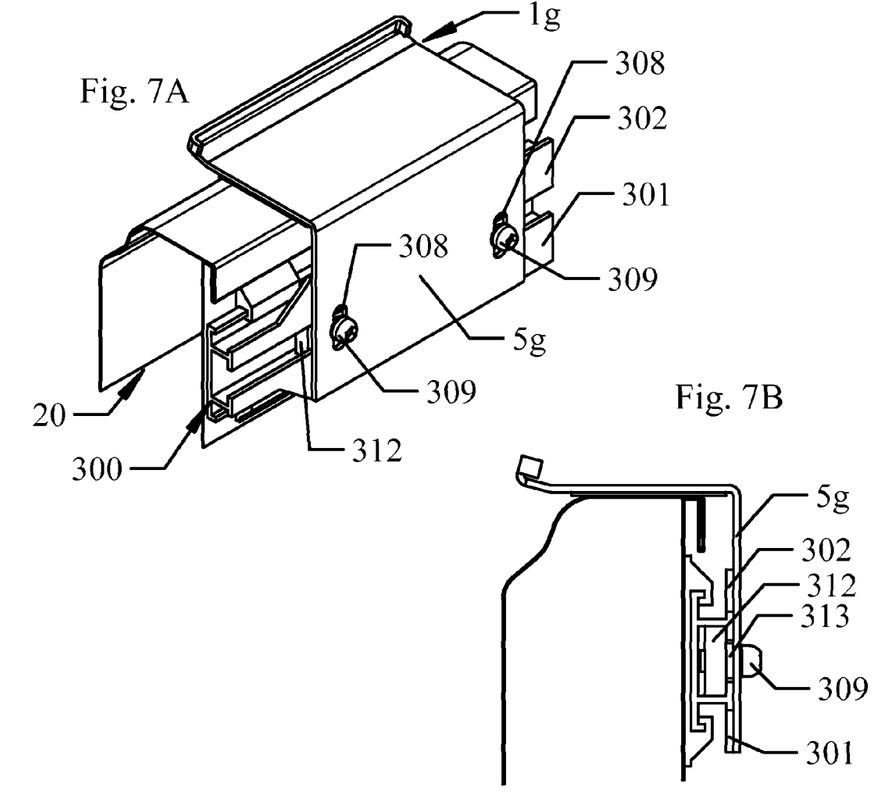
FIG. 7A shows a perspective view of a seventh embodiment of the bracket of the invention designed to mate to a cargo management rail.
FIG. 7B shows a cutaway view of the bracket of FIG. 7A.
Figure 7C:
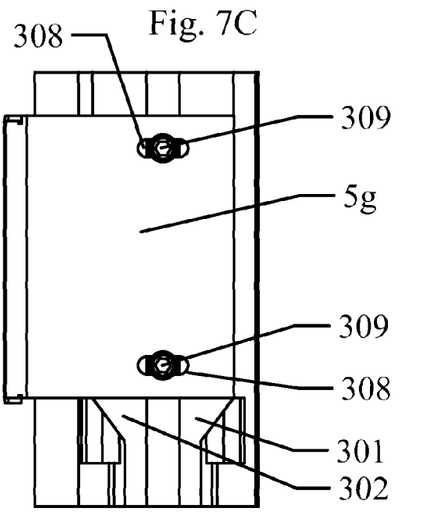
FIG. 7C shows a side view of the bracket of FIG. 7A.
Figure 7D:
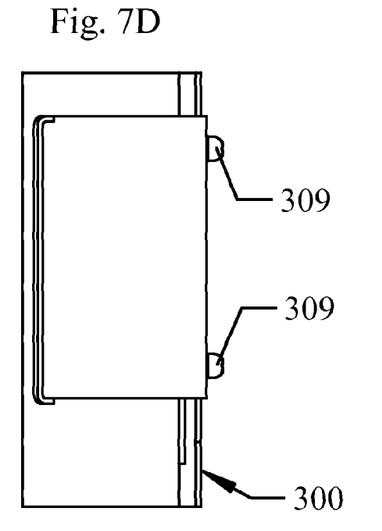
FIG. 7D shows a top plan view of the bracket of FIG. 7A.

A similar integrated clamp and bracket assembly 1d is depicted in FIG. 4B. In this embodiment, second horizontal member 15 is replaced by angled member 15b. Angled member 15b is not parallel to horizontal member 2d, but instead lies in a plane inclined such that the end of angled member 15b farthest from vertical member 5d lies closer to the plane of member 2d. The lower end of vertical member 5d may be bent inward at an acute angle to form 15b. A through bore 16b is provided in angled member 15b. The inclined angle of the plane of 15b and the location of the through bore are arranged such that the axis 40 through the center-line of the through bore is oriented substantially toward the line formed at the intersection of horizontal member 2d and vertical member 5d. This arrangement provides that when the bracket is placed over the top of the vehicle bed side member 20 a shaft 18b passing through bore 16b will press against the inside corner formed by the intersection of the lower surface of top rail 22 and the inner surface of side rail 23 of the vehicle bed side member. In the specific embodiment depicted, the shaft 18b comprises a threaded rod with an upper end and a lower end, the upper end having a clamp pad 19b attached and the lower end having a provision for rotating the rod—in this case consisting of a hexagonal head for operative engagement with a wrench or socket. Furthermore, in the fourth embodiment depicted in FIG. 4B, the angled member 15b has its edge turned up to create an inward facing radius near the edge. This radius can contact a threaded member which, in this embodiment is a substantially sphere-shaped member 41 with a threaded bore through its center and a radius substantially similar to the radius formed near the edge of member 15b. The clamp pad 19b in the embodiment depicted in FIG. 4B also has a substantially spherical shape. However, the clamp pad 19b could be any shape that best correspondingly engages with the components of a particular vehicle. This design provides a degree of flexibility in the direction of shaft 18b since the sphere shaped threaded member 41 may rotate slightly against the radius formed in the edge of angled member 15b. This allows pad 19b to make firm contact with the inner corner of the vehicle bed member as the shaft is tightened. This allowance for a slight angular adjustment of the shaft is desirable to ensure a forceful clamping against the intersection of the vehicle bed rail members. As described above, a protective material 13 may be provided between the contacting surfaces of the bracket and the vehicle. For the same reasons, clamp pad 19b can be made of, or covered with, a similar material.

The specific embodiments of the integrated bracket and clamp devices depicted in FIGS. 4A and 4B are merely intended to illustrate the concept of integrated brackets of the invention. It is understood that the member represented by 15 and 15b can be formed in other ways and with differing angles and still perform the same function within the scope of the present invention. Furthermore, the clamping mechanisms shown are not intended to limit the scope of the claimed invention: similar clamping mechanisms based on threaded rods, bolts, nuts, hand wheels, knobs, cams, springs etc. are known in the art and could be readily employed within the scope of the invention. As there are many different vehicles with varying body styles, the bracket geometry and clamping mechanism may also vary to best fit each specific vehicle.

Figures 8A, 8B:
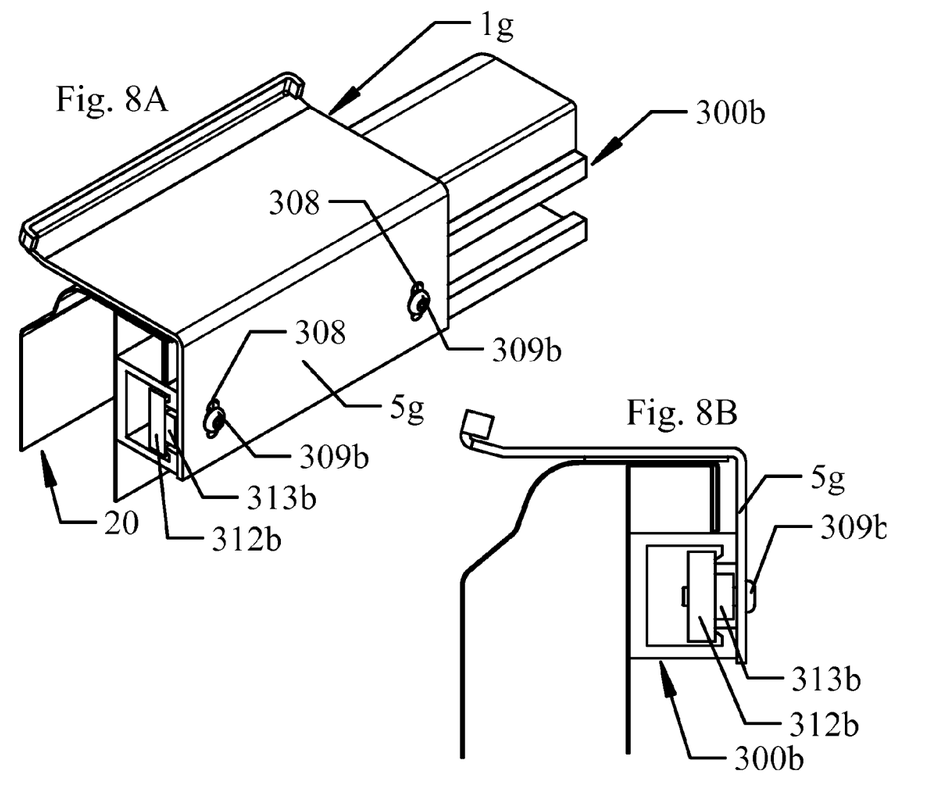
FIG. 8A shows a perspective view of an eighth embodiment of the bracket of the invention designed to mate to a cargo management rail.
FIG. 8B shows a cutaway view of the bracket of FIG. 6A.
Figure 8C:
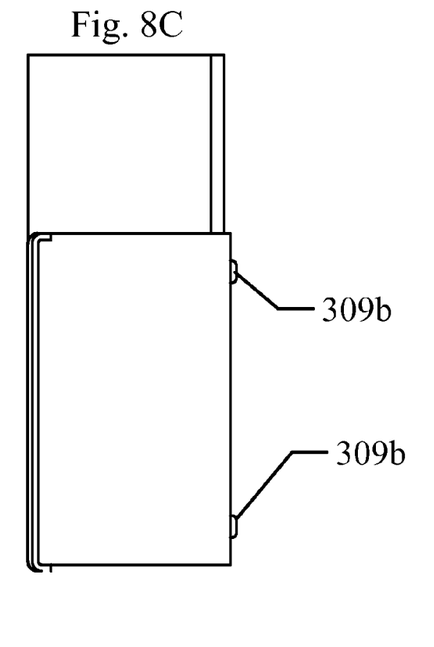
FIG. 8C shows a side view of the bracket of FIG. 6A.
Figure 8D:
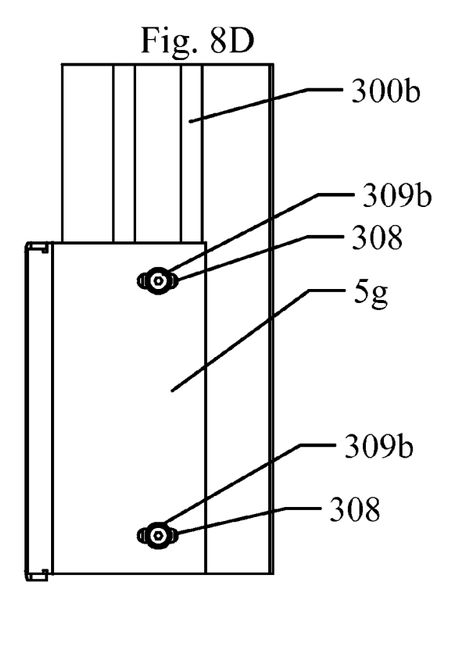
FIG. 8D shows a top plan view of the bracket of FIG. 8A.

In other embodiments of the present invention, a raingutter adapter bracket is designed to mate with a cargo management rail in the bed of a vehicle. In this case, the bracket does not engage the vehicle bed rail members directly, but instead is removably attached to the rails of a cargo management system. The rails of cargo management systems are typically mounted longitudinally on the inside of a vehicle bed near the top edges of the vehicle bed side members 20. The rails themselves have a variety of designs that vary in their specifics according to the manufacturer. Generally however, they all consist of an extruded profile including a flat surface which contacts the vehicle bed member(s) and an opposite surface, bearing profiles designed to allow the attachment of clamping members of various designs. Typically, the profiles may include one or more C-shaped channels, and/or one or more T-shaped protrusions. The representative cargo management rail depicted in FIGS. 5A-B, 6A-B, and 7A-B has a central C-shaped channel as well as two T-shaped protrusions. This particular type of rail allows several possible methods for attachment of the raingutter adapter bracket, three such possibilities are presented in FIGS. 5A-7D. The channel of FIGS. 8A and 8B has a simpler design consisting of a single C-shaped channel. Of course, the design of the clamping members of raingutter adapter brackets of the present invention may vary according to the specific geometry of the particular cargo management rail to which it is designed to attach.

In a fifth embodiment depicted in FIGS. 5A to 5D, the raingutter adapter bracket 1e comprises most of the features enumerated above in the embodiments of FIGS. 1-3. However, an additional clamping member 303 is attached to the inner surface of vertical member 5e. Clamping member 303 has a profile including a first surface which is flat and fits against the flat inner surface of vertical member 5e, and a second surface which bears two longitudinal protrusions 301 and 302. The longitudinal protrusions are substantially L-shaped. The L-shaped protrusions are parallel to one another and separated by a gap. The two parallel longitudinal L-shaped protrusions are oriented such that their edges face toward each other across the gap separating them. Thus the plane of the clamping member's second surface together with the two L-shaped protrusions thereon define a T-shaped channel. The T-shaped channel is sized to engage one of the T-shaped protrusions on the cargo system rail. (It should be noted that in the embodiment illustrated in FIGS. 5A-5D, the rail has two such T-shaped protrusions and the clamping member engages the uppermost of the two protrusions (302) of course, the same design could be used within the scope of the invention to engage the lower T-shaped protrusion 301). In the embodiment illustrated in FIGS. 5A-5D, the clamping member 303 is attached to the vertical member 5e of the raingutter adapter bracket 1e by a plurality of threaded fasteners 304. Obviously, any suitable means of attachment could be employed as for instance by using other types of fasteners, or by using a permanent means of attachment such as riveting, welding, or integral forming. As in previous embodiments a protective material may optionally be provided between the bracket and the vehicle bed members or cargo management rail(s).

In operation the raingutter adapter bracket of FIGS. 5A-5D is secured to the cargo management rail 300 by the action of threaded studs 306. These studs pass through coaxial bores through the vertical member 5e and clamping member 303. One or both of these bores is threaded for engagement with threaded studs 306. Turning the threaded studs 306 (by means of knobs 305) biases the ends of the studs toward the top surface of the T-shaped protrusion 302 on the cargo management accessory rail 300. As the ends of the threaded studs 306 contact and press on that surface, they pull the T-shaped channel of the clamping member into secure engagement with the T-shaped protrusion on the rail and thereby secure the raingutter adapter bracket to the cargo management rail.

The bracket if of the sixth embodiment, depicted in FIGS. 6A-6D, is similar to the embodiments of FIGS. 5A-5D, except the clamping mechanism operates slightly differently. In this embodiment, the clamping member 303a, has a T-shaped channel which is wide enough to encompass the outer edges of both the upper and lower T-shaped protrusions of the cargo management rail (302 and 301 respectively). Threaded studs 306 pass through coaxial bores in vertical member 5f and clamping member 303a, one or both of which is threaded. Turning the threaded studs 306 by means of knobs 305 biases their ends toward a flat surface of the cargo accessory rail. When the studs are tightened against this surface, the T-shaped channel of clamping member 303a is pulled securely against the outer flanges of the upper and lower T-shaped protrusions, thereby securing the raingutter adapter bracket to the cargo accessory rail.

The bracket 1g of the seventh embodiment, depicted in FIGS. 7A-7D, represents yet another embodiment engaging the same cargo management rail. In this case, the vertical member 5g of the bracket has a plurality of vertical slots 308 penetrating it. Threaded fasteners 309 pass freely through these slots and each engages a clamping member 312 slidingly engaged in the T-shaped channel of the cargo management rail. The clamping members 312 each have a threaded bore for engagement with fasteners 309. Optionally, spacers 313 are provided between clamping members 312 and vertical surface 5g. The clamping members 312 are shaped such that, in at least one orientation, they are captive in the T-shaped channel. As the threaded fasteners 309 are tightened, a surface of the captive clamping members 312 presses against the lower sides of the flanges defining the top of the T-shaped slot in the cargo management rail. This, in turn, firmly presses the inner surface of vertical member 5g against the vertical surfaces of T-shaped protrusions 301 and 302 and thereby provides a secure attachment of the raingutter adapter bracket to the cargo accessory rail.

FIGS. 8A-8D show the eighth embodiment, similar to the raingutter adapter bracket of FIGS. 7A-7D, engaged with a cargo accessory rail of a different design. The operative characteristics of the eighth embodiment are substantially the same as described above for the embodiment of FIGS. 7A-7D with captive clamping member 312b and optional spacer 313b acting with threaded fasteners 309b to secure the bracket to the T-shaped channel of the cargo management rail 300b.

It should be understood that modifications of the specific fasteners, the clamping members, the materials or the methods of manufacture of the raingutter adapter brackets in the preceding examples are within the scope of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:
1. A bracket for adapting a side wall of a bed of an open bed vehicle to receive a rain-gutter tower comprising:
 a) a first horizontal member having a first end and a second end opposite the first end;
 b) at least one clamp for removably attaching the first horizontal member to the sidewall; and
 c) an upright member extending upward from the first end of the first horizontal member and having a compound bend comprising an obtuse bend portion having an obtuse angle and a substantially right angle bend portion having a substantially right angle such that a plane of the upright member lies at a slightly acute inward-facing angle relative to a plane of the horizontal member, wherein the obtuse angle bend portion of the upright member extends directly from the horizontal member and the substantially right angle bend portion extends directly from an end of the obtuse angle bend portion opposite the horizontal member;

wherein the upright member simulates a rain gutter of a vehicle and is shaped to receive the rain-gutter tower.

2. The bracket of claim 1 wherein the at least one clamp comprises:
   a) at least one clamping member having a slot capable of accommodating an inner rail of the side wall; and
   b) at least one fastener for attaching the at least one clamping member to the first horizontal member;
   such that when the inner rail of the side wall is placed in the slot of the at least one clamping member and the at least one clamping member is attached to the first horizontal member with the at least one fastener, the bracket is fixedly retained to the side wall.

3. The bracket of claim 1 further comprising a vertical member extending downward from the second end of the first horizontal member, wherein the vertical member is substantially parallel to an inner rail of the side wall.

4. The bracket of claim 3 wherein the at least one clamp comprises:
   a) at least one clamping member; and
   b) at least one fastener for attaching the at least one clamping member to the vertical member;
   such that when the at least one clamping member is attached to the vertical member with the at least one fastener, an inner rail of the side wall is secured between the clamping member and the vertical member, thereby securing the bracket to the side wall.

5. The bracket of claim 3 further comprising a second horizontal member extending from a lower end of the vertical member toward the side wall.

6. The bracket of claim 5 wherein the at least one clamp comprises at least one threaded fastener engaging at least one threaded hole in the second horizontal member.

7. The bracket of claim 6 wherein, upon rotation of the at least one threaded fastener in the at least one threaded hole, an end of the at least one threaded fastener presses against an underside of a top rail of the side wall, thereby securing the bracket to the side wall.

8. The bracket of claim 3 further comprising an angled member extending from a lower end of the vertical member toward the side wall, wherein the at least one clamp comprises:
   a) at least one threaded fastener;
   b) at least one threaded hole through the angled member,
   such that when the at least one threaded fastener passes through the threaded hole in the angled member, rotation of the fastener will cause a toggle to advance toward and press against a corner formed between an inner rail and a top rail of the side wall, thereby securing the bracket to the side wall.

9. The bracket of claim 3 further comprising an angled member extending from a lower end of the vertical member toward the side wall, wherein the at least one clamp comprises:
   a) at least one threaded fastener;
   b) at least one hole through the angled member, said hole having a diameter larger than a major diameter of the at least one threaded fastener; and
   c) for each of the at least one threaded fasteners:
      a nut having a circular cross section and a threaded bore through its diameter; and
      a gripping portion having a circular cross section, rotatably coupled to the end of each of the at least one threaded fasteners;
   such that when the at least one threaded fastener passes through the bore in the angled member and is threaded through the nut, rotation of the fastener will cause a toggle to advance toward and press against a corner formed between an inner rail and a top rail of the side wall, thereby securing the bracket to the side wall.

10. The bracket of claim 1, further comprising protective material disposed between the bracket and the side wall of the vehicle.

11. A method for assembling a bracket for adapting a side wall of an open bed of a vehicle to receive a rain-gutter tower, wherein the bracket comprises a horizontal member having a first end and a second end opposite the first end, at least one clamp for removably attaching the horizontal member to the side wall, and an upright member extending upward from the first end of the first horizontal member and having a compound bend comprising an obtuse bend portion having an obtuse angle and a substantially right angle bend portion having a substantially right angle such that a plane of the upright member lies at a slightly acute inward-facing angle relative to a plane of the horizontal member, wherein the obtuse angle bend portion of the upright member extends directly from the horizontal member and the substantially right angle bend portion extends directly from an end of the obtuse angle bend portion opposite the horizontal member, wherein the upright member simulates a rain gutter of a vehicle and is shaped to receive the rain-gutter tower, comprising the step of removably attaching the bracket to the side wall using the clamp.

12. The method of claim 11 wherein the clamp attaches the bracket to the side wall by means of a fastener.

13. The method of claim 11 wherein the clamp is integrally formed with the bracket.

14. The method of claim 11, further comprising the step of attaching the rain-gutter tower to the bracket, wherein the upright member provides a clamping surface to attach to the rain-gutter tower.

15. The bracket of claim 1, wherein the side wall comprises an outer panel, an inner rail parallel to the outer panel, and a top rail having a first end connected to the outer panel and a second end connected to the inner rail.

16. The bracket of claim 3 further comprising an angled member extending from a lower end of the vertical member toward the side wall.

17. The bracket of claim 16 wherein the at least one clamp comprises at least one threaded fastener engaging at least one hole in the angled member.

18. The method of claim 11, wherein the side wall comprises an outer panel, an inner rail parallel to the outer panel, and a top rail having a first end connected to the outer panel and a second end connected to the inner rail.

* * * * *

UNITED STATES PATENT AND TRADEMARK OFFICE
CERTIFICATE OF CORRECTION

PATENT NO. : 8,157,229 B2
APPLICATION NO. : 11/861502
DATED : April 17, 2012
INVENTOR(S) : Palermo Page 1 of 1

It is certified that error appears in the above-identified patent and that said Letters Patent is hereby corrected as shown below:

Claim 11 (Column 12, line 35): replace "attaching-the" with "attaching the"

Signed and Sealed this
Twenty-sixth Day of June, 2012

David J. Kappos
*Director of the United States Patent and Trademark Office*